(12) United States Patent
Matsufusa

(10) Patent No.: US 6,825,890 B2
(45) Date of Patent: Nov. 30, 2004

(54) TRANSPARENT COORDINATE INPUT DEVICE AND LIQUID CRYSTAL DISPLAY DEVICE INCORPORATING THE SAME

(75) Inventor: Hideto Matsufusa, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 6 days.

(21) Appl. No.: 10/389,434

(22) Filed: Mar. 14, 2003

(65) Prior Publication Data

US 2003/0174128 A1 Sep. 18, 2003

(30) Foreign Application Priority Data

Mar. 18, 2002 (JP) ........................................ 2002-075247

(51) Int. Cl.[7] ..................... G02F 1/1335; G02F 1/1333; G09G 5/00
(52) U.S. Cl. .......................... 349/12; 349/122; 349/138; 349/149; 345/173
(58) Field of Search ........................... 349/12, 122, 138, 349/149–152; 345/173

(56) References Cited

U.S. PATENT DOCUMENTS

| | | | | |
|---|---|---|---|---|
| 4,233,522 A | | 11/1980 | Grummer et al. ........... 341/174 |
| 5,440,080 A | * | 8/1995 | Nagaoka et al. ......... 178/19.01 |
| 5,548,306 A | | 8/1996 | Yates, IV et al. ........... 345/174 |
| 5,774,107 A | * | 6/1998 | Inou ........................... 345/104 |
| 5,831,702 A | * | 11/1998 | Ito .............................. 349/12 |
| 6,721,019 B2 | * | 4/2004 | Kono et al. ................... 349/12 |
| 2001/0008433 A1 | * | 7/2001 | Fujii et al. .................... 349/12 |
| 2001/0022632 A1 | * | 9/2001 | Umemoto et al. ............ 349/12 |
| 2001/0026330 A1 | * | 10/2001 | Oh .............................. 349/12 |
| 2002/0158853 A1 | * | 10/2002 | Sugawara et al. .......... 345/176 |

* cited by examiner

Primary Examiner—Tarifur R. Chowdhury
(74) Attorney, Agent, or Firm—Brinks Hofer Gilson & Lione

(57) ABSTRACT

A coordinate input device including: an upper film substrate; a first electrode layer formed on a rear surface of the upper film substrate; a lower film substrate; a second electrode layer formed on a surface of the lower film substrate, the surface facing the first electrode layer; and a transparent dielectric film held and bonded between the upper and lower film substrates. In the coordinate input device, the upper and lower film substrates and the first and second electrode layers are transparent.

2 Claims, 4 Drawing Sheets

TRANSPARENT COORDINATE INPUT DEVICE AND LIQUID CRYSTAL DISPLAY DEVICE INCORPORATING THE SAME

BACKGROUND OF THE INVENTION

1. Field of the Invention

The present invention relates to an electrostatic capacitive coordinate input device for example used as a pointing device of personal computers, etc.

2. Description of the Related Art

Referring to FIG. 7, which shows a schematic diagram of a conventional coordinate input device. The coordinate input device 100 is a kind of pointing device mounted in notebook-size personal computers, etc, in which coordinates can be entered by changing electrostatic capacities.

The conventional coordinate input device 100 has: an X-electrode layer 103 composed of a plurality of X-electrodes 102 stacked on the top surface of a film substrate 101 (detecting substrate) made of a synthetic resin; and a Y-electrode layer 105 composed of a plurality of Y-electrodes 104 stacked on the rear surface of the film substrate 101, wherein the X-electrodes 102 and Y-electrodes 104 are arranged in the form of a matrix.

The X-electrode layer 103 and Y-electrode layer 105 are formed from metal patterns in the form of a matrix and the surfaces of the electrode layers are covered with insulating films 106 and 107, respectively.

Further, the coordinate input device 100 is provided with a surface sheet 108 on the side of the X-electrode layer 103, which is to be used as an operation side. The electrode layers 103, 105, insulating films 106, 107, and surface sheet 108 have the same rectangular shape in outer dimensions.

The coordinate input device 100 is also provided with a control circuit board 110 as a bottom layer on the side opposite from the surface sheet 108. The control circuit board 110 is formed with the same outer dimensions as those of the film substrate 101.

The control circuit board 110 is also provided with a control circuit 111 on the surface thereof opposite from the film substrate 101.

In the case of the conventional coordinate input device 100, a cursor or the like, which appears in the display of personal computers, etc., can be moved by electrically connecting the X-electrode layer 103 and Y-electrode layer 105 to the control circuit 111 and detecting the changes in electrostatic capacity between the X-electrode layer 103 and Y-electrode layer 105 with the control circuit 111.

However, the conventional coordinate input device 100 is opaque in the film substrate 101 and control circuit board 110. Accordingly, even when the conventional coordinate input device 100 was placed on the front surface of a liquid crystal cell (not shown), it was impossible to view images displayed on the liquid crystal cell and the like through the input device 100.

Therefore, it was also impossible to incorporate a conventional electrostatic capacitive coordinate input device 100 in a liquid crystal display device.

The invention was made in consideration of the foregoing problem. It is an object of the invention to provide a transparent electrostatic capacitive coordinate input device, which can be incorporated in a liquid crystal display device, and a liquid crystal display device with the coordinate input device.

SUMMARY OF THE INVENTION

As first means for solving the above problem, the invention provides a coordinate input device arranged to include:
an upper film substrate;
a first electrode layer formed on a rear surface of the upper film substrate;
a lower film substrate;
a second electrode layer formed on a surface of the lower film substrate, the surface facing the first electrode layer; and
a transparent dielectric film held between the upper and lower film substrates,
wherein the upper and lower film substrates and the first and second electrode layers are transparent.

In an arrangement of the coordinate input device as second means for solving the above problem, the dielectric film includes a transparent base and transparent adhesive layers respectively formed on top and bottom surfaces of the base, and the upper and lower film substrates are bonded to the dielectric film with the transparent adhesive layers.

In an arrangement of the coordinate input device as third means for solving the above problem, the upper film substrate has first and second end portions opposed to each other, the first electrode layer is formed from a plurality of drive electrode patterns extending in a direction from the first end portion of the upper film substrate to the second end portion thereof and insulated from each other, a plurality of ground patterns extending in a direction from the second end portion to the first end portion are formed between the drive electrode patterns, and the ground patterns are each electrically connected.

Further, as fourth means for solving the above problem, the invention provides a liquid crystal display device with the coordinate input device, one of the above first to third means; the liquid crystal display device is arranged to include a liquid crystal cell and the coordinate input device provided on a front surface of the liquid crystal cell.

As fifth means for solving the above problem, the liquid crystal display device according to the invention is arranged so that the liquid crystal cell and coordinate input device are housed in a housing to be integrated.

As described above, in the coordinate input device according to the invention, the upper and lower film substrates, and the first and second electrode layers are transparent, and the transparent dielectric film is held between the upper and lower film substrates. Therefore, it is possible to provide a transparent coordinate input device suitable for use in a liquid crystal display device.

In the coordinate input device according to the invention, the dielectric film includes a transparent base and transparent adhesive layers respectively formed on top and bottom surfaces of the base, and the upper and lower film substrates are bonded to the dielectric film with the transparent adhesive layers. Therefore, it is possible to provide a coordinate input device with a superior transparency.

Since a plurality of ground patterns extending in a direction from the second end portion to the first end portion are formed between the drive electrode patterns and each electrically connected, only one length of lead pattern is used to connect the ground patterns and therefore a space can be used efficiently.

Further, since each of the ground patterns is located between the drive circuit patterns, a stray capacitance which arises between the drive circuit patterns can be reduced. This makes it possible to detect the changes in electrostatic capacity between the X-electrode pattern and Y-electrode pattern with high accuracy.

Further, the invention provides a liquid crystal display device with the coordinate input device, one of the above first to third means; the liquid crystal display device is arranged to include a liquid crystal cell and the coordinate input device provided on a front surface of the liquid crystal cell. This makes it possible to view images displayed on the liquid crystal cell through the transparent coordinate input device and to enter a desired coordinate directly through an operation on the liquid crystal display device, and therefore a liquid crystal display device with good operability can be provided.

Additionally, since the liquid crystal cell and coordinate input device are housed in a single housing to be integrated, a portable liquid crystal display device with a coordinate input device integrated thereinto can be provided.

DESCRIPTION OF THE PREFERRED EMBODIMENTS

Figure 1:
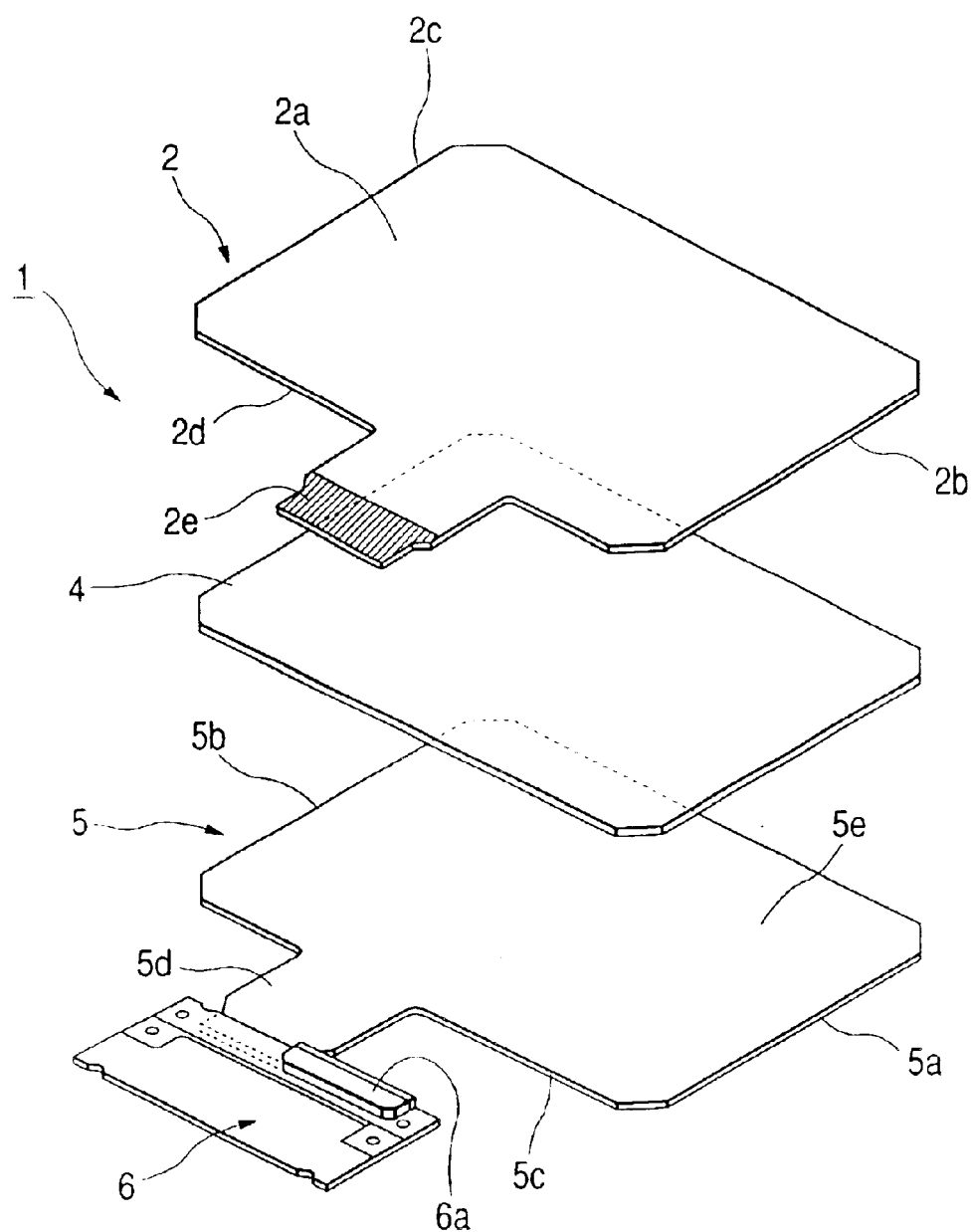
FIG. 1 is an exploded perspective view of a coordinate input device according to the invention.
Figure 2:
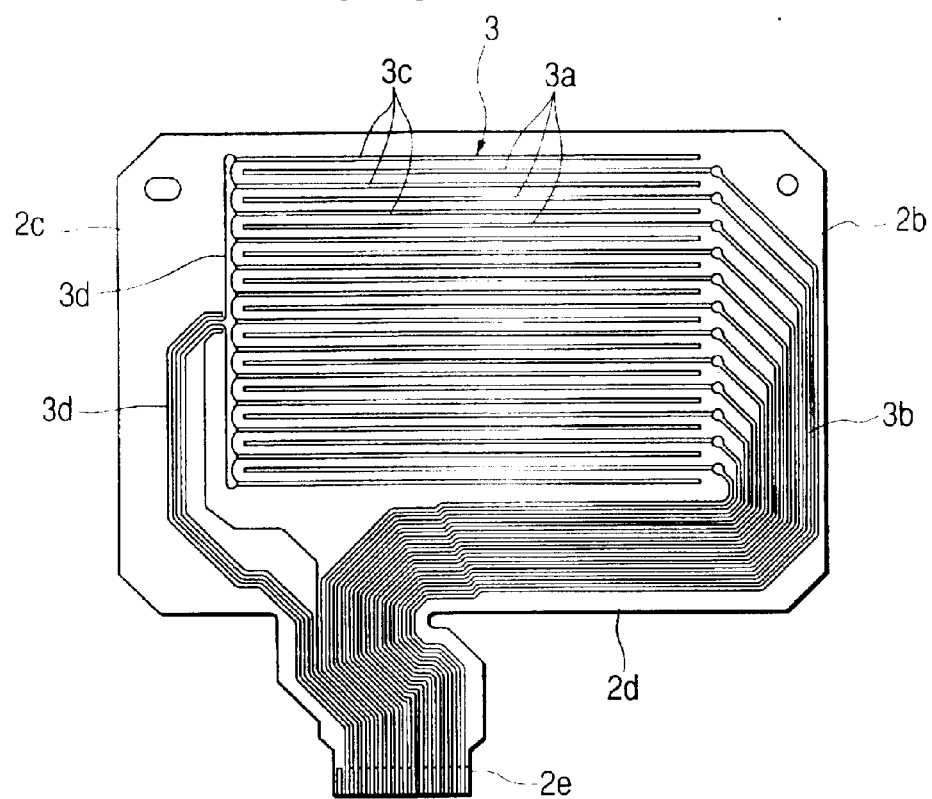
FIG. 2 is a plan view of an upper film substrate in connection with the invention.
Figure 3:
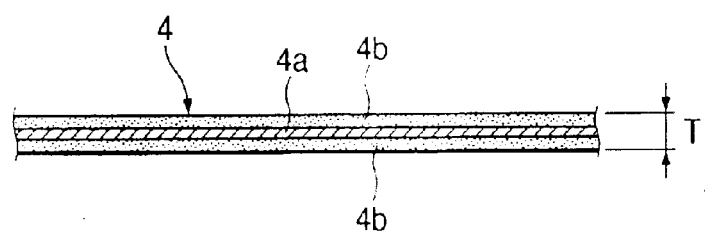
FIG. 3 is a substantial part cross-sectional view of a dielectric film in connection with the invention.
Figure 4:
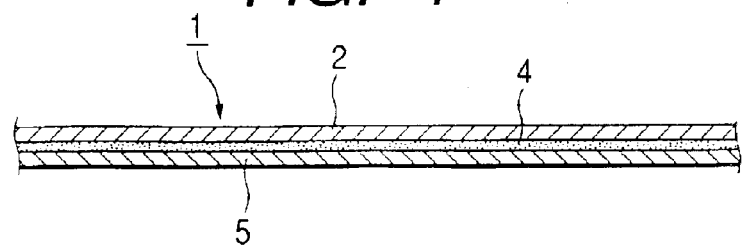
FIG. 4 is a substantial part cross-sectional view of a coordinate input device according to the invention.
Figure 5:
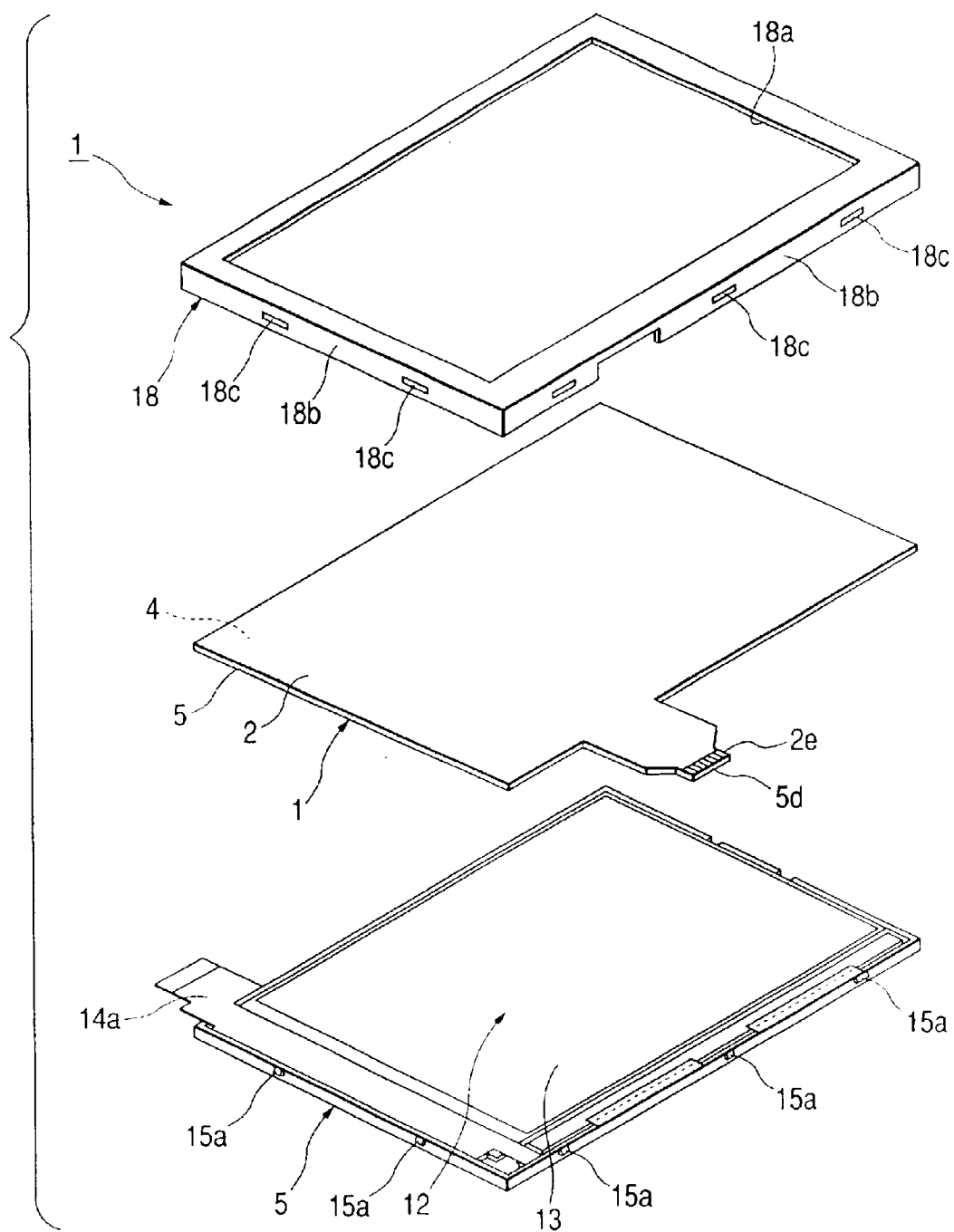
FIG. 5 is an exploded perspective view of a liquid crystal display device according to the invention.
Figure 6:
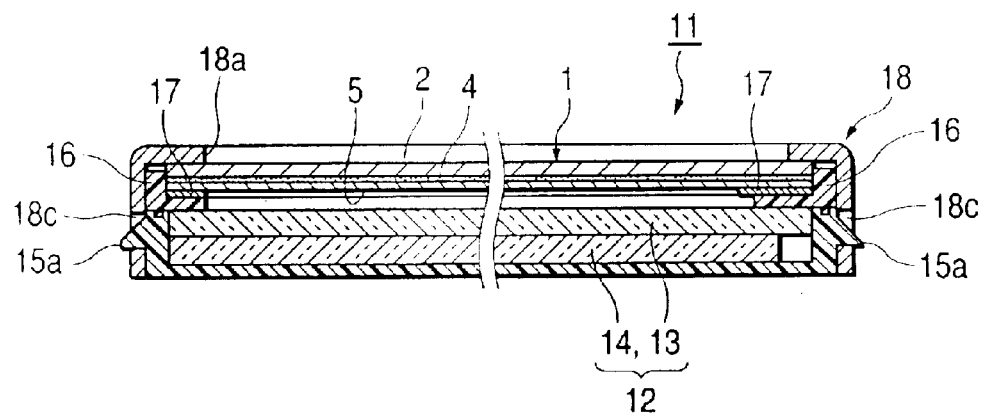
FIG. 6 is a substantial part cross-sectional view of the liquid crystal display device according to the invention.
Figure 7:
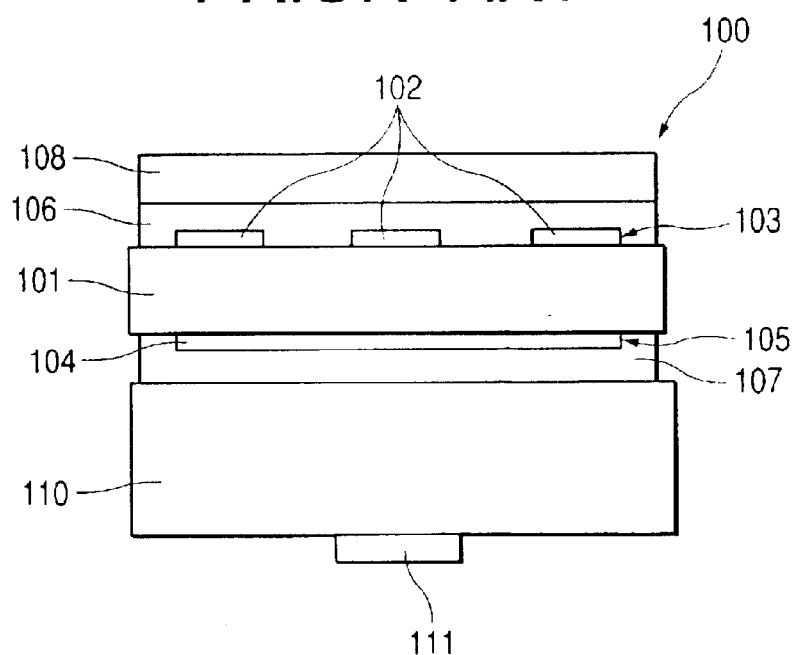
FIG. 7 is a schematic diagram of a conventional coordinate input device.

A coordinate input device according to the invention will be described below in reference to the drawings. FIG. 1 is an exploded perspective view of the coordinate input device according to the invention. FIG. 2 is a plan view of an upper film substrate in connection with the invention. FIG. 3 is a substantial part cross-sectional view of a dielectric film in connection with the invention. FIG. 4 is a substantial part cross-sectional view of a coordinate input device according to the invention. FIG. 5 is an exploded perspective view of a liquid crystal display device according to the invention. FIG. 6 is a substantial part cross-sectional view of a liquid crystal display device according to the invention.

The coordinate input device 1 of the invention has an upper film substrate 2 having a thickness of about 0.2 mm provided on the top of the input device as shown in FIG. 1. The upper film substrate 2 is formed from an insulative transparent film of a synthetic resin such as polyethylene terephthalate (PET).

The upper film substrate 2 has the outside shape of a general rectangle and it has a transparent and wear-resistant over-coat surface 2a formed on the top surface thereof. The upper film substrate 2 also has a terminal section 2e formed in a portion thereof, which laterally protrudes from a side edge 2d extending between opposite end portions 2b and 2c shown on the right and left sides of the drawing.

Further, as shown in FIG. 2, on the rear surface of the upper film substrate 2 are formed X-electrode patterns 3, e.g. a plurality of drive electrode patterns, which constitute one electrode layer.

The X-electrode patterns 3, which constitute one of the electrode layers described above, include a plurality of drive electrode patterns 3a extending in the direction from the end portion 2b to the other end portion 2c.

The plurality of drive electrode patterns 3a are individually insulated and connected to the respective lead patterns 3b to lead to the terminal section 2e.

Further, a plurality of ground patterns 3c are formed between the drive electrodes 3a extending in the direction from the end portion 2c to the end portion 2b.

The ground patterns 3c are electrically connected to a single lead pattern 3d to lead to the terminal section 2e.

The drive electrode patterns 3a and ground patterns 3c are formed by growing a transparent indium tin oxide (ITO) film to a given thickness through sputtering, etc. and then etching the ITO film into desired patterns through a photolithography technique.

Therefore, portions where the drive electrode patterns 3a and ground patterns 3c are formed are transparent. The lead patterns 3b and 3d are formed into silver patterns through printing, etc.

Further, a transparent dielectric film 4 is located under the upper film substrate 2. As shown in FIG. 3, the dielectric film 4 includes a base 4a composed of a transparent PET film and transparent adhesive layers 4b over both the top and bottom surfaces of the base 4a, and has a thickness T of about 0.1 mm.

The transparent adhesive layers 4b are put on both the top and bottom surfaces of the base 4a and then fitted under pressure or heat to be integrated with the base 4a firmly.

In addition, a lower film substrate 5 having a thickness of about 0.2 mm is provided under the dielectric film 4. The lower film substrate 5 is formed from an insulative transparent film of a synthetic resin such as PET in common with the upper film substrate 2.

The lower film substrate 5 has the outside shape of a general rectangle and it has a terminal section 5d formed in a portion thereof, which laterally protrudes from a side edge 5c extending between opposite end portions 5a and 5b.

The lower film substrate 5 also has a plurality of Y-electrode patterns (not shown), i.e. the other electrode layer, formed on a surface 5e facing the dielectric film 4. The Y-electrode patterns are formed from a transparent ITO film as in the case of the X-electrode patterns 3 and arranged in the form of a matrix in Y-direction perpendicular to the drive electrode patterns 3a formed on the upper film substrate 2.

Further, a control circuit board 6 is provided in the leading end portion of the terminal section 5d. The terminal sections 2e and 5d of the upper and lower film substrates 2 and 5 are connected to the control circuit board 6. The control circuit board 6 is also mounted with a control device 6a such as a ROM.

In the coordinate input device 1 having the above configuration according to the invention, sliding a pen, a finger, or the like over the over-coat surface 2a of the upper film substrate 2 changes the electrostatic capacity between the X-electrode pattern 3 and the Y-electrode pattern (not shown) at a location where the pen, finger, or the like lies. Therefore, the control device 6a detects changes in the electrostatic capacity, whereby a desired coordinate can be entered.

Further, as shown in FIGS. 5 and 6, in a liquid crystal display device 11 with the coordinate input device 1 according to the invention, the coordinate input device 1 is placed on the front surface (top surface) of the liquid crystal cell 12, whereby a desired coordinate can be entered and images, etc. displayed on the liquid crystal cell 12 can be read out.

The liquid crystal cell 12 of the liquid crystal device display 11 with such coordinate input device 1 according to the invention has a pair of insulating substrates 13 and 14 respectively composed of upper and lower rectangular glass substrates, which are provided opposed to each other, as shown in FIG. 6. A liquid crystal (not shown) is sealed in between the pair of insulating substrates 13 and 14.

Further, a polarizing plate (not shown) is put on the top surface of the pair of insulating substrates 13 and 14 with a liquid crystal sealed in.

In addition, a reflecting member (not shown) is put on the rear surface of the liquid crystal cell 12, i.e. the bottom surface in the drawing. The reflecting member serves to reflect light from the outside, incident on the liquid crystal cell 12 from above, upward in the drawing and back to the outside again.

The liquid crystal cell 12 has a flexible printed board 14a for driving the electrodes (not shown) in the insulating substrate 14, which is provided on an end portion of the lower-side insulating substrate 14, as shown in FIG. 5.

Also, the liquid crystal cell 12 is housed in a first support member 15, whereby the movement of the cell is restricted.

The first support member 15 has right-angled hooks 15a formed on peripheral portions thereof so as to project therefrom. The hooks can snap-on engage a housing 18 to be described later.

On the front surface of the liquid crystal cell 12, i.e. the upper surface thereof in the drawing, is placed the above-described coordinate input device 1. Incidentally, the coordinate input device 1 and liquid crystal cell 12 are formed with nearly the same dimensions.

Such coordinate input device 1 is housed in a second support member 16 to be restricted in movement and bonded to a bottom plate 16a of the second support member 16 with a transparent adhesive 17.

The first and second support members 15 and 16 are also housed in the housing 18 to be integrated. The housing 18 is made of a stainless plate, etc. and given the shape of a box by drawing, etc. as shown in FIG. 5.

Further, the housing 18 has a generally rectangular opening 18a in the upper portion thereof and a plurality of engaged portions 18c in the peripheral side plates 18b. The engaged portions 18c can be snap-on engaged with the hooks 15a of the first support member 15.

When the second support member 16 with the coordinate input device 1 housed therein is positioned with respect to the first support member 15 with the liquid crystal cell 12 housed therein to be placed on the first support member 15, and then the housing 18 is put on both the first and second support members from above, the hooks 15 of the first support member 15 are snap-on engaged with the corresponding engaged portions 18b of the housing 18. As a result, the liquid crystal cell 12 and coordinate input device 1 are housed in the housing 18 to be integrated.

The liquid crystal display device 11, into which the coordinate input device 1 is integrated, makes it possible to view images displayed on the liquid crystal cell 12 through the transparent coordinate input device 1. The liquid crystal display device 11 also enables moving (or dragging) of the images, etc. through operations performed on the over-coat surface 2a of the upper film substrate 2 by a finger or the like.

The invention has been described for an embodiment of the coordinate input device 1, in which the X-electrode patterns 3 are formed on the upper film substrate 2. However, the X-electrode patterns 3 and Y-electrode patterns may be formed on the lower film substrate 5 and upper film substrate 2, respectively.

What is claimed is:

1. A coordinate input device comprising:

an upper film substrate;

a first electrode layer on a rear surface of said upper film substrate;

a lower film substrate;

a second electrode layer formed on a surface of said lower film substrate, the surface of the lower film substrate facing said first electrode layer; and a transparent dielectric film held between said upper and lower film substrates, wherein said upper and lower film substrates and said first and second electrode layers are transparent, and wherein said dielectric film comprises: a transparent base; and transparent adhesive layers respectively formed on top and bottom surfaces of the base, and said upper and lower film substrates are bonded to said dielectric film with said transparent adhesive layers.

2. A coordinate input device comprising:

an upper film substrate;

a first electrode layer formed on a rear surface of said upper film substrate;

a lower film substrate;

a second electrode layer formed on a surface of said lower film substrate, the surface of the lower film substrate facing said first electrode layer; and a transparent dielectric film held between said upper and lower film substrates, wherein said upper and lower film substrates and said first and second electrode layers are transparent, and wherein said upper film substrate has first and second end portions opposed to each other, said first electrode layer is formed from a plurality of drive electrode patterns extending in a direction from the first end portion of said upper film substrate to the second end portion thereof and insulated from each other, a plurality of ground patterns extending in a direction from the second end portion to the first end portion are formed between said drive electrode patterns; the ground patterns are each electrically connected.

* * * * *